(12) United States Patent
Kang et al.

(10) Patent No.: US 7,006,908 B2
(45) Date of Patent: Feb. 28, 2006

(54) ENGINE TORQUE CONTROL APPARATUS

(75) Inventors: Jihoon Kang, Fuji (JP); Toshiyasu Yamaguchi, Fuji (JP); Yoshichika Hagiwara, Fuji (JP); Yasutaka Kawamura, Fuji (JP)

(73) Assignee: JATCO LTD, (JP)

( * ) Notice: Subject to any disclaimer, the term of this patent is extended or adjusted under 35 U.S.C. 154(b) by 0 days.

(21) Appl. No.: 10/634,727

(22) Filed: Aug. 5, 2003

(65) Prior Publication Data

US 2004/0117096 A1 Jun. 17, 2004

(30) Foreign Application Priority Data

Aug. 5, 2002 (JP) .............................. 2002-228002

(51) Int. Cl.
G06F 17/00 (2006.01)
G06F 19/00 (2006.01)

(52) U.S. Cl. .......................... 701/54; 701/51; 701/101; 477/34; 477/37; 477/110

(58) Field of Classification Search .................. 701/51, 701/53–54, 101–102; 477/34, 37, 90, 107–110; 123/406.23
See application file for complete search history.

(56) References Cited

U.S. PATENT DOCUMENTS

| | | | | |
|---|---|---|---|---|
| 4,815,340 A | * | 3/1989 | Iwatsuki et al. ............... | 477/98 |
| 5,103,692 A | * | 4/1992 | Shimanaka et al. .......... | 477/109 |
| 5,403,245 A | * | 4/1995 | Watanabe et al. ............. | 477/54 |
| 5,496,228 A | * | 3/1996 | Takata et al. ................ | 477/107 |
| 5,496,230 A | * | 3/1996 | Ando et al. .................. | 477/111 |
| 5,672,138 A | * | 9/1997 | Mikami et al. ............. | 477/111 |
| 5,916,059 A | * | 6/1999 | Takiguchi .................... | 477/152 |
| 6,254,508 B1 | * | 7/2001 | Kojima et al. .............. | 477/109 |
| 6,406,403 B1 | * | 6/2002 | Steeby ......................... | 477/109 |
| 6,687,591 B1 | * | 2/2004 | Abe ............................ | 701/54 |
| 6,829,528 B1 | * | 12/2004 | Kang et al. .................... | 701/51 |

FOREIGN PATENT DOCUMENTS

EP 0 759 518 A 2/1997
EP 1 074 424 A 2/2001

\* cited by examiner

*Primary Examiner*—Gertrude A. Jeanglaude
(74) *Attorney, Agent, or Firm*—Rossi, Kimms & McDowell, LLP

(57) ABSTRACT

There is provided an engine torque control apparatus that is comprised of a torque-down amount calculating section to which the throttle valve opening and the engine speed are inputted and which calculates the torque-down amount based on the inputted values, an inertia correction amount calculating section that calculates the correction amount for inertia of each component part (inertia discharged torque), a friction correction amount calculating section that calculates the correction amount for friction generated by a belt CVT (friction discharged torque), a torque-down amount correcting section that corrects the torque-down amount based on the calculated correction amounts, and an engine torque control section that controls engine torque. Since the engine torque is controlled with inertia and friction discharged torque of each component part being taken into account, the upper limit of the torque inputted to an automatic transmission can be accurately controlled to the value of the allowable input torque of the automatic transmission.

8 Claims, 4 Drawing Sheets

ENGINE TORQUE CONTROL APPARATUS

BACKGROUND OF THE INVENTION

1. Field of the Invention

The present invention relates to an engine torque control apparatus in an automatic transmission provided with a torque converter.

2. Description of the Prior Art

Conventionally, a V-belt type continuously variable transmission (hereinafter referred to as "belt CVT") has been used as an automatic transmission for a vehicle. The belt CVT is constructed such that a primary pulley and a secondary pulley whose groove widths are variably controlled according to oil pressure supports a V belt by sandwiching it, and power is transmitted by contact frictional force of the V belt.

An example of the belt CVT has been disclosed in Japanese Laid-Open Patent Publication No. 11-37237. In the belt CVT disclosed in this publication, the thrust of pulleys is determined based on the input torque and the gear ratio, and it is converted to oil pressure value according to predetermined values indicative of the pressure receiving areas of the secondary pulley and the primary pulley, or the like, and the oil pressure value is supplied as target line pressure to a transmission mechanism.

Further, this belt CVT is provided with a torque converter that is disposed between an engine and the transmission mechanism, so that the torque inputted from the engine is subjected to amplification or the like and then transmitted to the transmission mechanism.

In the above described conventional belt CVT provided with the torque converter, the torque converter amplifies output torque from the engine, and transmits the torque to the transmission mechanism. The output torque from the engine is reduced by torque-down control so as to prevent an excessive torque greater than the allowable input torque of the belt CVT from being inputted to the transmission mechanism of the belt CVT due to torque amplification. The amount of torque-down by such torque-down control is found from the throttle valve opening and the engine speed, and the torque-down amount is set to become smaller as the engine speed increases, and to become greater as the throttle valve opening increases.

However, torque discharge occurs due to rotational inertia of the engine and the belt CVT, and hence the torque-down amount found from the throttle valve opening and the engine speed must include a margin for absorbing the torque discharged due to the rotational inertia. Since the margin for absorbing the discharged torque is required, the torque-down amount must be set to a great value, which deteriorates the engine performance in the case when the vehicle starts running with a stall condition, the case when the vehicle climbs a critical up-slope, and in other cases.

SUMMARY OF THE INVENTION

It is therefore an object of the present invention to provide an engine control apparatus that prevents engine output torque from being reduced excessively by engine torque-down control.

To attain the above object, there is provided an engine control apparatus which includes an automatic transmission comprised of a torque converter and a transmission mechanism, an engine connected to an input shaft of the torque converter, an engine torque control section that controls output torque of the engine, and a discharged torque calculating means for calculating a discharged torque of at least one of the engine and the automatic transmission, and wherein the engine control section controls engine output torque according to the discharged torque calculated by the discharged torque calculating means.

According to the present invention, the engine torque control section controls engine output torque according to the discharged torque calculated by the discharged torque calculating means, and hence when engine torque is reduced so as to prevent the torque inputted to the automatic transmission from exceeding the allowable input torque, the torque which is actually inputted to the automatic transmission after torque reduction can be made close to the allowable input torque with a high accuracy.

The above and other objects, features, and advantages of the invention will become more apparent from the following detailed description taken in conjunction with the accompanying drawings.

DETAILED DESCRIPTION OF THE PREFERRED EMBODIMENT

The present invention will now be described in detail with reference to the drawings showing a preferred embodiment thereof.

Figure 1:
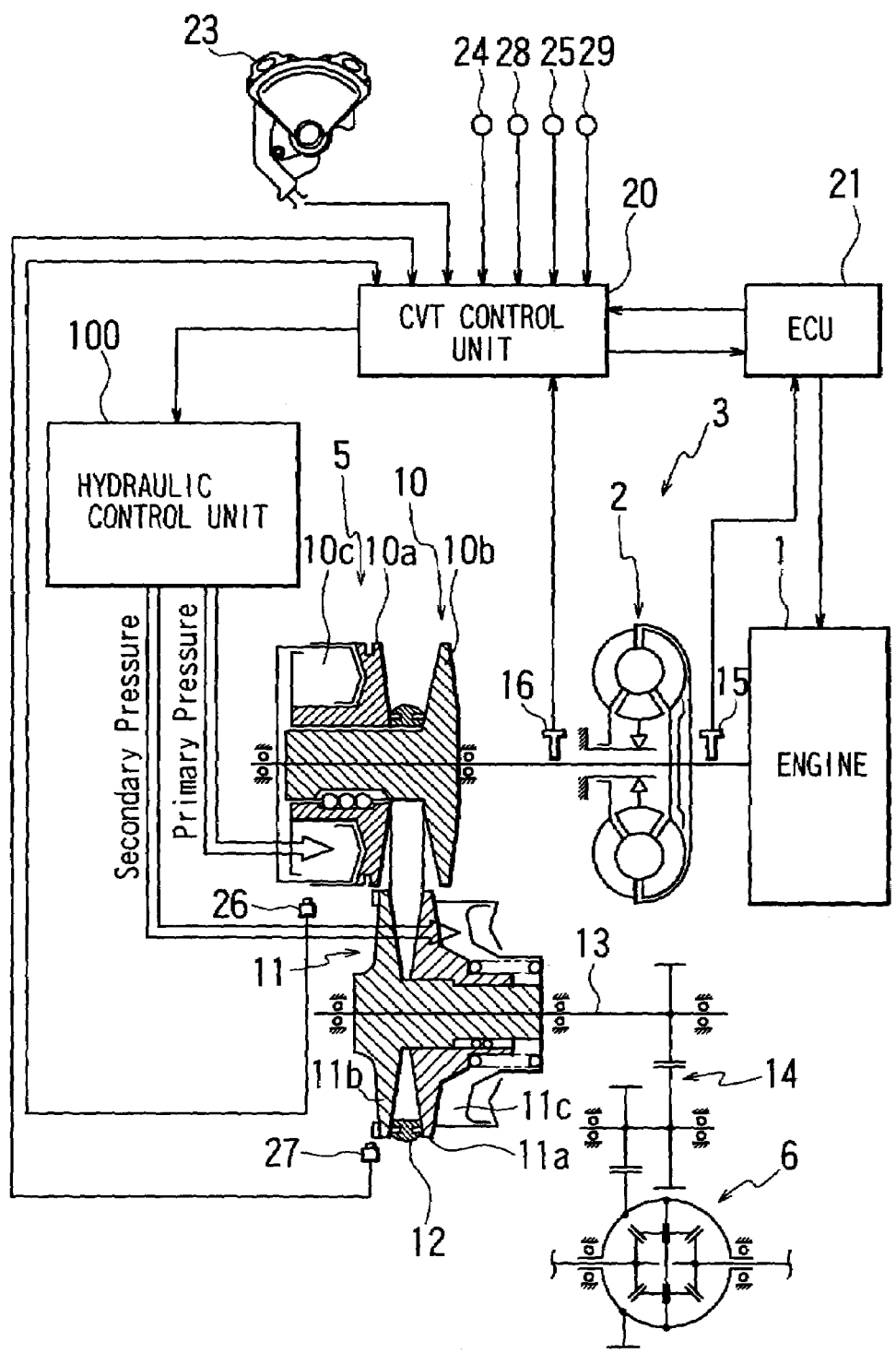
FIG. 1 is a diagram showing an engine torque control apparatus according to an embodiment of the present invention.
Figure 2:
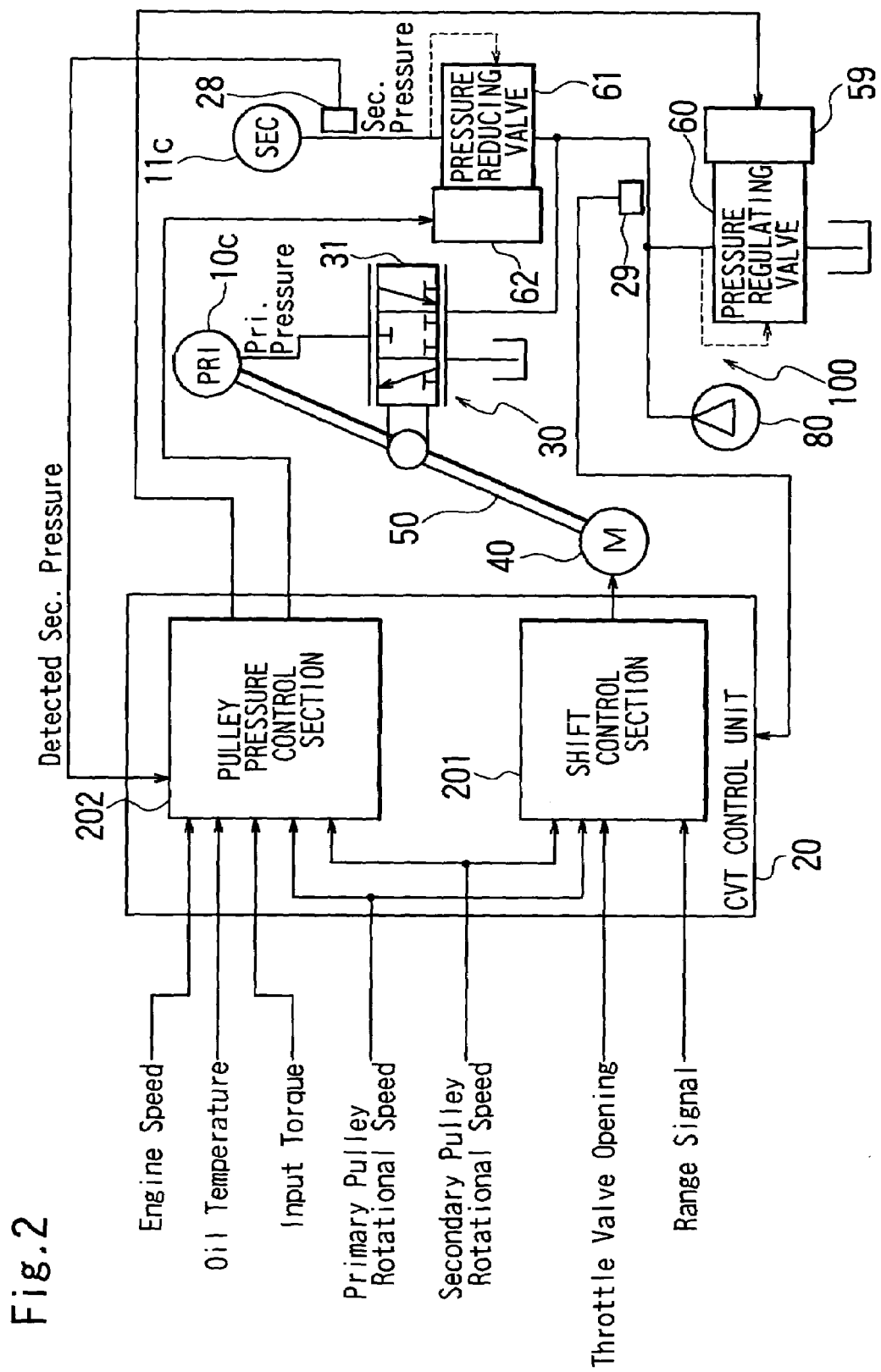
FIG. 2 is a diagram schematically showing a hydraulic control unit and a CVT control unit.

FIG. 1 is a diagram schematically showing the construction of a belt CVT according to the present invention, and FIG. 2 is a diagram schematically showing the constructions of a hydraulic control unit and a CVT control unit.

In FIG. 1, a belt CVT 3 comprised of a transmission mechanism 5 including a forward-backward driving switching mechanism (not shown), and a torque converter 2 including a lockup clutch (not shown), is connected to an engine 1. The transmission mechanism 5 is comprised of a pair of variable pulleys consisting of a primary pulley 10 on the input shaft side and a secondary pulley 11 connected to an output shaft 13, and the pair of variable pulleys 10 and 11 are connected to each other via a V belt 12. Note that the output shaft 13 is connected to a differential gear 6 via an idler gear 14 and a drive shaft.

The gear ratio of the transmission mechanism 5 and the contact frictional force generated by the V belt 12 are controlled by a hydraulic control unit 100 that is operable in response to commands given from a CVT control unit 20. The CVT control unit 20 is connected to an engine control unit 21 (hereinafter referred to as "ECU") 21 that controls the engine 1 so that the CVT control unit 20 and the ECU 21 can exchange information with each other. The CVT control unit 20 determines the gear ratio and the contact frictional force according to input torque information acquired from the ECU 21, the throttle valve opening (TVO) acquired from a throttle opening sensor 24, and so forth. Further, an engine speed sensor 15 that detects the revolutionary speed of the engine 1 is connected to the ECU 21, and a turbine sensor 16 that detects the rotational speed of an output shaft of the torque converter 2 is connected to the CVT control unit 20.

The primary pulley 10 of the transmission mechanism 5 is comprised of a fixed conical plate 10b that rotates integrally with an input shaft, and a movable conical plate 10a that is opposed to the fixed conical plate 10b to form a V-shaped pulley groove and is capable of being displaced in the axial direction according to oil pressure (hereinafter referred to as "primary pressure") applied to a primary pulley cylinder chamber 10c.

The secondary pulley 11 is comprised of a fixed conical plate 11b that rotates integrally with the output shaft 13, and a movable conical plate 11a that is opposed to the fixed conical plate 11b to form a V-shaped pulley groove and is capable of being displaced in the axial direction according to oil pressure (hereinafter referred to as "secondary pressure") applied to a secondary pulley cylinder chamber 11c.

The primary pulley cylinder chamber 10c and the secondary pulley cylinder chamber 11c are identical in pressure-receiving area with each other.

The torque inputted from the engine 1 is inputted to the transmission mechanism 5 via the torque converter 2, and is transmitted from the primary pulley 10 to the secondary pulley 11 via the V belt 12. The movable conical plate 10a of the primary pulley 10 and the movable conical plate 11a of the secondary pulley 11 are displaced in the axial direction to change the radius of contact between the V belt 12 and each of the pulleys 10 and 11, so that the gear ratio between the primary pulley 10 and the secondary pulley 11 can be changed continuously.

As shown in FIG. 2, the hydraulic control unit 100 is comprised mainly of a pressure regulating valve 60 that controls the line pressure, a shift control valve 30 that controls the primary (Pri) pressure which is applied to the primary pulley cylinder chamber 10c, and a pressure reducing valve 61 that controls the secondary (Sec) pressure which is applied to the secondary pulley cylinder chamber 11c.

The shift control valve 30 is connected to a servo link 50 constituting a mechanical feedback mechanism, so that the shift control valve 30 is activated by a step motor 40 connected to one end of the servo link 50 and receives feedback of the groove width, i.e. the actual gear ratio from the movable conical plate 10a of the primary pulley 10 connected to the other end of the servo link 50.

A line pressure control system is comprised of the pressure regulating valve 60 provided with a solenoid 59 that regulates pressure oil supplied from an oil pump 80, so that the pressure oil is controlled to a predetermined line pressure according to the operative state in response to a command (e.g. a duty signal) given from the CVT control unit 20. The line pressure is supplied to the shift control vale 30 that controls the primary pressure and a pressure reducing valve 61 including a solenoid 62 that controls the secondary pressure. A line pressure sensor 29 that detects the oil pressure of line pressure is connected to the CVT control unit 20.

The gear ratio between the primary pulley 10 and the secondary pulley 11 is controlled by the step motor 40 that is driven in response to a shift command signal given from the CVT control unit 20, and a spool 31 of the shift control valve 30 is driven according to the displacement of the servo link 50 moving in response to the operation of the step motor 40 to supply the primary pulley 10 with the primary pressure obtained by regulating the line pressure supplied to the shift control valve 30, so that the groove width is variably controlled to set a predetermined gear ratio.

It should be noted that the shift control valve 30 supplies and discharges oil pressure to and from the primary pulley cylinder chamber 10c according to the displacement of the spool 31, and controls the primary pressure so that the target gear ratio can be achieved at a position where the step motor 40 is driven. When the shift has been actually finished, the shift control valve 30 closes the spool 31 in response to the displacement of the servo link 50.

It should be noted that the CVT control unit 20 variably controls the gear ratio and the contact frictional force of the V belt 12 by reading signals from a primary pulley speed sensor 26 that detects the rotational speed of the primary pulley 10 of the transmission mechanism 5, a secondary pulley speed sensor 27 that detects the rotational speed of the secondary pulley 11 (or the vehicle speed), and a secondary pressure sensor 28 that detects the secondary pressure applied to the secondary pulley cylinder chamber 11c, all of which are appearing in FIG. 1, and a range signal supplied from an inhibitor switch 23 appearing in FIG. 1, as well as the throttle valve opening (TVO) obtained from the throttle opening sensor 24 that detects the opening degree of a throttle valve which is opened and closed in response to driver's operations, and the oil temperature of the transmission mechanism 5 detected by a temperature sensor 25 appearing in FIG. 1.

The CVT control unit 20 is comprised of a shift control section 201 that determines the target gear ratio according to the vehicle speed and the throttle valve opening and drives the step motor 40 to control the actual gear ratio to the target gear ratio, and a pulley pressure control section 202 that calculates the thrust (contact frictional force) of the primary pulley 10 and the secondary pulley 11 according to the input torque, gear ratio, oil temperature, and so forth, and converts the calculated thrust into an oil pressure.

The pulley pressure control section 202 determines the target value of the line pressure according to the input torque information, the gear ratio based on the primary pulley rotational speed and the secondary pulley rotational speed, and the oil temperature and drives the solenoid 59 of the pressure regulating valve 60 to control the line pressure, and determines the target value of the secondary pressure and drives the solenoid 62 of the pressure reducing valve 61 according to the value detected by the oil pressure sensor 28 as well as the target value to control the secondary pressure by feedback control (closed-loop control).

A description will now be given of how the engine control unit controls the engine torque with reference to FIGS. 3 and 4.

Figure 3:
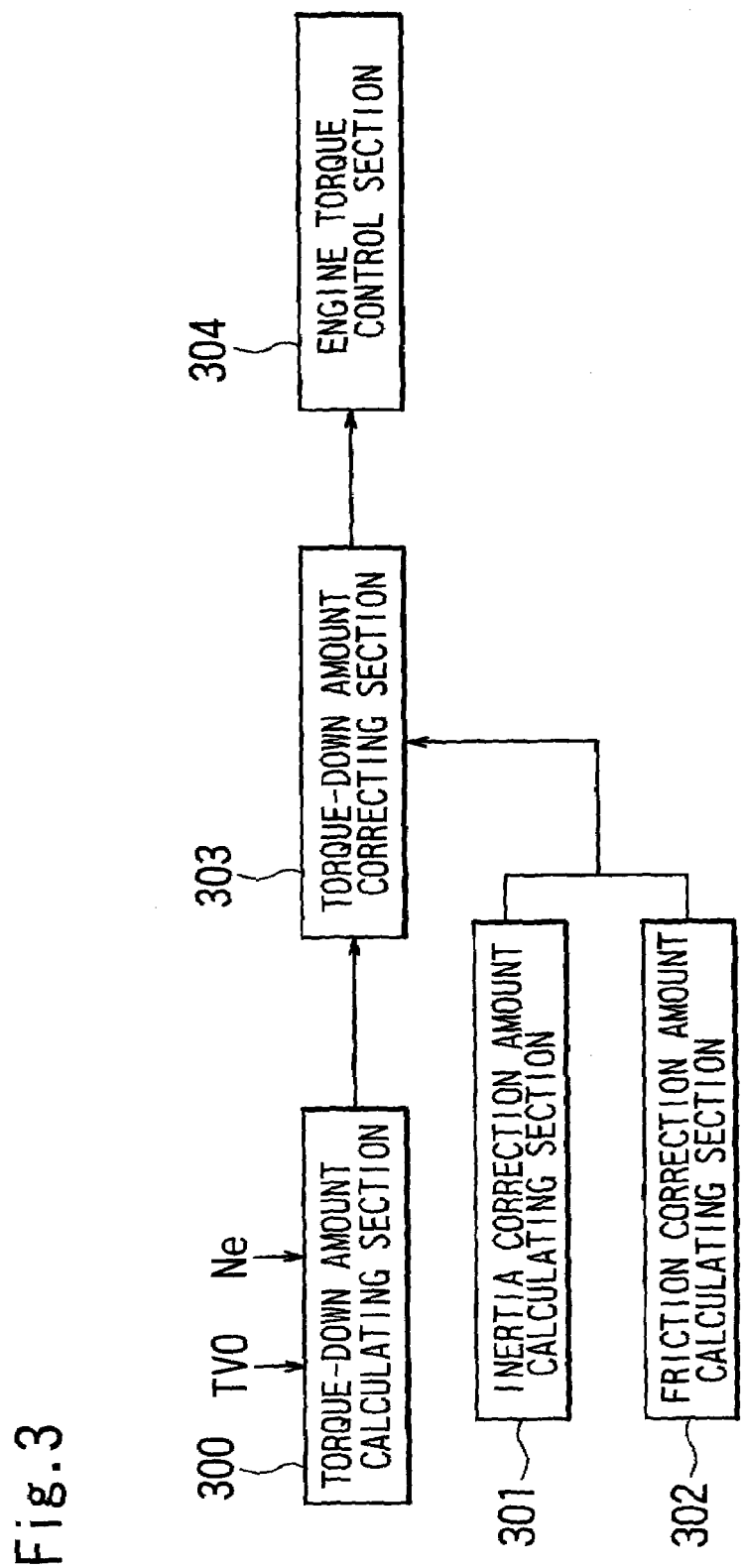
FIG. 3 is a block diagram showing the flow of calculation of the torque-down amount.
Figure 4:
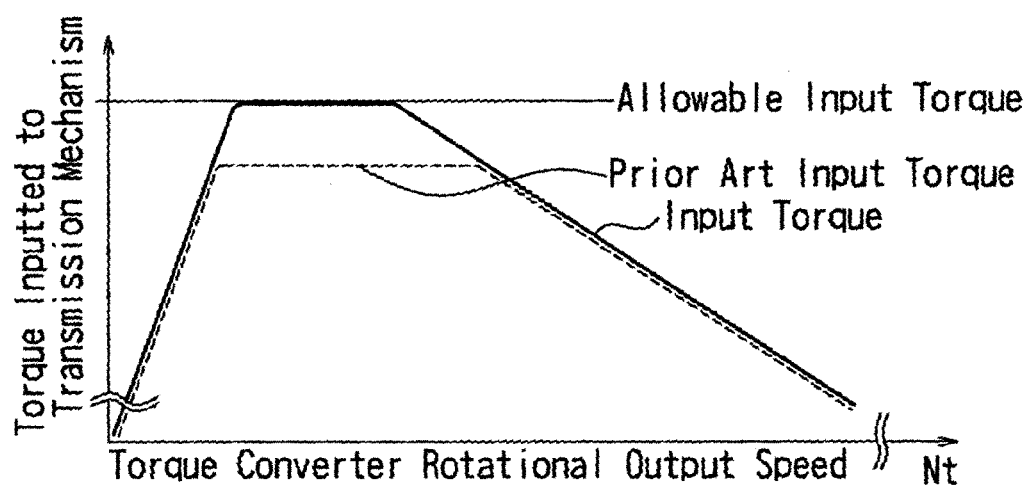
FIG. 4 is a diagram showing the values of torque inputted to a transmission mechanism.

FIG. 3 is a block diagram showing the flow of calculation of the torque-down amount, and FIG. 4 is a diagram useful in explaining how the torque is inputted to the transmission mechanism by engine torque control.

A torque-down amount calculating section 300 receives the throttle valve opening (TVO) and the engine speed (Ne), and calculates the torque-down amount $\Delta Te$ based on the received values. As is the case with the above described prior art, the torque-down amount $\Delta Te$ is set to become smaller as the engine speed increases, and to become greater as the throttle valve opening increases.

On the other hand, an inertia correction amount calculating section 301 calculates the amount of correction for inertia generated by the engine 1 and the belt CVT 3 (inertia discharged torque), and a friction correction amount calculating section 302 calculates the amount of correction for friction generated by the belt CVT 3 (friction discharged torque).

The inertia correction amount calculating section 301 calculates the engine inertia correction amount Tle with inertia of the output shaft of the engine 1 being taken into account, and calculates the T/M inertia correction amount Tp with inertia of the input shaft of the transmission mechanism 5 being taken into account.

The engine inertia correction amount Tle is calculated according to the following equation using the engine inertia Ie and the angular acceleration $\omega'e$ calculated based on the engine speed detected by the engine speed sensor 15:

$$Tle = Ie \times \omega'e \quad (1)$$

Similarly, the T/M inertia correction amount Tp is calculated according to the following equation using the inertia Ip of the input shaft of the transmission mechanism 5 and the angular acceleration $\omega'e$ calculated based on the turbine rotational speed detected by the turbine sensor 16:

$$Tle = Ip \times \omega'p \quad (2)$$

The friction correction amount calculating section 302 calculates the pressure friction correction amount Tfp with contact frictional force generated between the pulleys 10, 11 and the V belt 12 of the transmission mechanism 5 being taken into account, and the rotational friction correction amount Tfn with friction generated by rotation of the input shaft of the transmission mechanism 5 being taken into account. The contact frictional force generated between each of the pulleys 10 and 11 and the V belt 12 varies according to oil pressure supplied to each of the pulleys 10 and 11. Thus, the pressure friction correction amount Tfp can be calculated based on oil pressure supplied to the pulleys 10 and 11.

The pressure friction correction amount Tfp is calculated according to the following equation:

$$Tfp = \alpha \times P + a \quad (3)$$

where $\alpha$ and a are constants and p is pressure (here, the line pressure detected by the line pressure sensor 29).

Further, the rotational friction correction amount Tfp is calculated according to the following equation:

$$Tfn = \beta \times N + b \quad (4)$$

where $\beta$ and b are constants and N is the rotational speed of the input shaft of the transmission mechanism 5, which is detected by the turbine sensor 16.

A torque-down amount correcting section 303 corrects the torque-down amount $\Delta Te$, which is calculated by the torque-down amount calculating section 300, by the correction amounts calculated by the inertia correction amount calculating section 301 and the friction correction amount calculating section 302 according to the above equations (1) to (4), thus calculating the final torque-down amount $\Delta Te'$. The final torque-down amount $\Delta Te'$ is calculated according to the following equation:

$$\Delta Te' = \Delta te - Tle - (Tp + Tfp + Tfn)/t \quad (5)$$

where t is a torque ratio between the input side and the output side of the torque converter 2. Since the torque converter 2 is disposed between the transmission mechanism 5 and the engine 1 from which Tp, Tfp, and Tfn are derived, the values of Tp, Tfp, and Tfn are divided by the torque ratio t so that the values of Tp, Tfp, and Tfn can be reflected on the torque-down amount of the engine 1.

An engine torque control section (ENG torque control section) 304 controls the engine torque based on the final torque-down amount $\Delta Te'$ calculated by the torque-down amount correcting section 303.

FIG. 4 shows the relationship between the torque inputted to the torque converter and the rotational output speed (Nt) of the torque converter in the case where the engine torque is controlled when the vehicle is started at full throttle on a flat road. In a range where the torque inputted to the torque converter is greater than the allowable input torque of the transmission mechanism, the engine torque is controlled with the torque discharged due to inertia and friction of each component part being taken into account, so that the upper limit of the torque inputted to the transmission mechanism 5 can be accurately controlled to the value of the allowable input torque.

In the present embodiment, the inertia correction amount calculating section 301 and the friction correction amount calculating section 302 constitute a discharged torque calculating means of the present invention. The inertia correction amount calculating section 301 constitutes an inertia discharged torque calculating means of the present invention, and the friction correction amount calculating section 302 constitutes a friction discharged torque calculating means of the present invention. Further, the engine speed sensor 15 constitutes an engine speed detecting means of the present invention, and the turbine sensor 16 constitutes a rotational speed detecting means of the present invention. Further, the line pressure sensor 29 constitutes a line pressure detecting means of the present invention.

According to the present embodiment described above, when the engine torque is controlled, the torque discharged due to inertia and friction generated by the engine 1 and the transmission mechanism 5 is calculated by the inertia correction amount calculating section 301 as the inertia discharged torque calculating means and the friction correction amount calculating section 302 as the friction discharged torque calculating means, and the engine torque control section calculates the engine torque-down amount according to the calculated discharged torque. Therefore, the upper limit of the torque inputted to the transmission mechanism 5 can be accurately controlled to the value of the allowable input torque.

In this way, the torque inputted to the transmission mechanism 5 can be set to the value of the allowable input torque with a high accuracy since the engine torque-down amount is set by taking into account torque discharge caused by inertia and friction of the engine 1 and the transmission mechanism 5 in each state thereof, although in the prior art, the torque inputted to the transmission mechanism 5 is excessively smaller than the allowable input torque as indicated by broken lines in FIG. 4 since the amount of torque discharged due to inertia and friction is set as a margin.

Thus, the torque inputted to the transmission mechanism 5 is increased as compared with the prior art, and hence the engine performance of the vehicle can be improved.

Due to the improvement in engine performance, the automatic transmission that is small and inexpensive for the engine torque can be used.

Further, since the engine torque, i.e., the torque inputted to the transmission mechanism 5 can be controlled with an improved accuracy, clutches and the belt of the automatic transmission never slip, and the durability and strength of component parts can be improved to realize a high reliability.

Further, since the inertia correction amount calculating section 301 as the inertia discharged torque calculating means calculates the torque discharged due to inertia of the input shaft of the transmission mechanism 5 according to the rotational speed detected by the turbine sensor 16 as the rotational speed detecting means, and the engine torque control section controls the engine torque according to the calculated torque discharged due to inertia, the upper limit of the torque inputted to the transmission mechanism 5 can be controlled to the value of the allowable input torque with an improved accuracy.

Further, since the inertia correction amount calculating section 301 as the inertia discharged torque calculating means calculates the torque discharged due to inertia generated by engine revolution according to the engine speed detected by the engine speed sensor 15 as the engine speed detecting means, and the engine torque control section controls engine torque according to the calculated torque discharged due to inertia, the upper limit of the torque inputted to the transmission mechanism 5 can be controlled to the value of the allowable input torque with an improved accuracy.

Further, since the friction correction amount calculating section 302 as the friction discharged torque calculating means calculates the torque discharged due to friction generated by rotation of the input shaft of the transmission mechanism 5 according to the rotational speed of the input shaft of the transmission mechanism 5 detected by the turbine sensor 16 as the rotational speed detecting means, and the engine torque control section controls the engine torque according to the calculated torque discharged due to friction, the upper limit of the torque inputted to the transmission mechanism 5 can be controlled to the value of the allowable input torque with an improved accuracy.

Further, since the friction correction amount calculating section 302 as the friction discharged torque calculating means calculates a friction discharged torque corresponding to a contact frictional force generated between the primary pulley 10 and the secondary pulley 11 and the V belt 12 according to the line pressure detected by the line pressure sensor 29 as the line pressure detecting means, and the engine torque control section controls the engine torque according to the calculated torque discharged due to friction, the upper limit of the torque inputted to the transmission mechanism 5 can be controlled to the value of the allowable input torque with an improved accuracy.

It is to be understood that in the above described embodiment, the present invention is applied to the V belt type continuously variable transmission, but may be applied to a multiple disc type automatic transmission with a torque converter.

Further, although in the above described embodiment, the engine speed is detected using the engine speed sensor 15, the present invention is not limited to this, but the engine speed may be calculated using the ECU 21 that controls the engine.

Further, according to the present invention, since the torque discharged due to inertia and friction of the output shaft of the transmission mechanism 5 and other members is calculated to correct the torque-down amount .Te, the upper limit of the torque inputted to the transmission mechanism 5 can be controlled to the value of the allowable input torque with an improved accuracy.

Although in the above described embodiment, the engine torque-down amount is calculated, the present invention is not limited to this, but an engine torque control value may be calculated. In this case, the correction values calculated by the inertia correction amount calculating section 301 and the friction correction amount calculating section 302 are added to the calculated engine torque control value.

It should be understood that the present invention is not limited to the embodiment described above, but various variations of the above described embodiment may be possible without departing from the spirits of the present invention.

What is claimed is:

1. An engine torque control apparatus comprising:
a continuously variable transmission comprising a torque converter and a transmission mechanism, wherein said transmission mechanism includes a primary pulley, a secondary pulley, and a belt for transmitting power from the primary pulley to the secondary pulley;
an engine connected to an input shaft of said torque converter;
an engine torque control section that controls torque output from said engine;
discharged torque calculating means for calculating a discharged torque of at least one of said engine and said transmission; and
rotational speed detecting means for detecting a rotational speed of said primary pulley,
wherein said engine torque control section controls torque of said engine according to the discharged torque calculated by said discharged torque calculating means,
wherein said discharged torque calculating means calculates a friction discharged torque produced by contact frictional force, generated when the pulleys sandwich the belt therebetween,
wherein said engine torque control section controls torque of the engine based on the calculated friction discharged torque,
wherein said discharged torque calculating means comprises inertia discharged torque calculating means for calculating an inertia discharged torque of said engine or said transmission,
wherein said engine torque control section controls torque of said engine according to the inertia discharged torque calculated by said inertia discharged torque calculating means, and
wherein said inertia discharged torque calculating means calculates an inertia discharged torque produced by rotation of said transmission mechanism according to the rotational speed detected by said rotational speed detecting means.

2. An engine torque control apparatus comprising:
a continuously variable transmission comprising a torque converter and a transmission mechanism, wherein said transmission mechanism includes a primary pulley, a secondary pulley, and a belt for transmitting power from the primary pulley to the secondary pulley;
an engine connected to an input shaft of said torque converter;
an engine torque control section that controls torque output from said engine;
discharged torque calculating means for calculating a discharged torque of at least one of said engine and said transmission; and
engine speed detecting means for detecting a revolutionary speed of a rotary shaft of said engine,
wherein said engine torque control section controls torque of said engine according to the discharged torque calculated by said discharged torque calculating means, wherein said discharged torque calculating means calculates a friction discharged torque produced by contact frictional force, generated when the pulleys sandwich the belt therebetween, wherein said engine torque control section controls torque of the engine based on the calculated friction discharged torque, wherein said discharged torque calculating means comprises inertia discharged torque calculating means for calculating an inertia discharged torque of said engine or said transmission, wherein said engine torque control section controls torque of said engine according to the inertia discharged torque calculated by said inertia discharged torque calculating means, and wherein said inertia discharged torque calculating means calculates an inertia discharged torque produced by said rotary shaft of said engine according to the revolutionary speed detected by said engine speed detecting means.

3. An engine torque control apparatus comprising:

a continuously variable transmission comprising a torque converter and a transmission mechanism, wherein said transmission mechanism includes a primary pulley, a secondary pulley, and a belt for transmitting power from the primary pulley to the secondary pulley;

an engine connected to an input shaft of said torque converter;

an engine torque control section that controls torque output from said engine;

discharged torque calculating means for calculating a discharged torque of at least one of said engine and said transmission; and rotational speed detecting means for detecting a rotational speed of said primary pulley, wherein said engine torque control section controls torque of said engine according to the discharged torque calculated by said discharged torque calculating means, wherein said discharged torque calculating means calculates a friction discharged torque produced by contact frictional force, generated when the pulleys sandwich the belt therebetween, wherein said engine torque control section controls torque of the engine based on the calculated friction discharged torque, wherein said discharged torque calculating means comprises friction discharged torque calculating means for calculating a friction discharged torque of said transmission, wherein said engine torque control section controls torque of said engine according to the friction discharged torque calculated by said friction discharged torque calculating means, and wherein said friction discharged torque calculating means calculates a rotational friction discharged torque produced by rotation of said transmission mechanism according to the rotational speed detected by said rotational speed detecting means.

4. An engine torque control apparatus comprising:

an automatic transmission comprising a torque converter and a transmission mechanism;

an engine connected to an input shaft of said torque converter;

an engine torque control section that controls torque output from said engine; and discharged torque calculating means for calculating a discharged torque of at least one of said engine and said automatic transmission, wherein said discharged torque calculating means comprises friction discharged torque calculating means for calculating a friction discharged torque of said automatic transmission, wherein said engine torque control section controls torque of said engine according to the friction discharged torque calculated by said friction discharged torque calculating means, wherein said automatic transmission is a V belt type continuously variable transmission constructed such that a pair of variable pulleys are connected to each other via a V belt and oil pressure is supplied to oil chambers provided in respective ones of the pulleys so that the gear ratio thereof is changeable, wherein the engine torque control apparatus comprises line pressure detecting means for detecting an oil pressure of line pressure as a basis for oil pressure to be supplied to the respective ones of the pulleys, and wherein said friction discharged torque calculating means calculates a friction discharged torque produced by contact frictional force, generated when the pulleys sandwich the V belt therebetween, based on the line pressure detected by said line pressure detecting means.

5. An engine torque control apparatus comprising:

a continuously variable transmission comprising a torque converter and a transmission mechanism;

an engine connected to an input shaft of said torque converter;

angular acceleration calculating means for calculating an angular acceleration of an output shaft of said engine or an input shaft of said transmission;

an engine torque control section that controls torque output from said engine; and discharged torque calculating means for calculating a discharged torque of at least one of said engine and said transmission, wherein said discharged torque calculating means comprises inertia discharged torque calculating means for calculating an inertia discharged torque of said engine or said transmission based on the angular acceleration calculated by said angular acceleration calculating means, and wherein said engine torque control section controls torque of said engine according to the inertia discharged torque calculated by said inertia discharged torque calculating means.

6. An engine torque control apparatus comprising:

a continuously variable transmission comprising a torque converter and a transmission mechanism;

an engine connected to an input shaft of said torque converter;

line pressure detecting means for detecting line pressure supplied to said transmission mechanism;

an engine torque control section that controls torque output from said engine; and discharged torque calculating means for calculating a discharged torque of at least one of said engine and said transmission, wherein said discharged torque calculating means comprises friction discharged torque calculating means for calculating a friction discharged torque of said transmission based on the line pressure detected by said line pressure detecting means, and wherein said engine torque control section controls torque of said engine according to the friction discharged torque calculated by said friction discharged torque calculating means.

7. An engine torque control apparatus according to claim 1, further comprising:

engine speed detecting means for detecting a revolutionary speed of a rotary shaft of said engine, wherein said inertia discharged torque calculating means calculates an inertia discharged torque produced by said rotary shaft of said engine according to the revolutionary speed detected by said engine speed detecting means.

8. An engine torque control apparatus according to claim 4, further comprising:

rotational speed detecting means for detecting a rotational speed of said primary pulley, wherein said friction discharged torque calculating means calculates a rotational friction discharged torque produced by rotation of said transmission mechanism according to the rotational speed detected by said rotational speed detecting means.

* * * * *